(12) United States Patent
Xu et al.

(10) Patent No.: US 12,182,272 B2
(45) Date of Patent: Dec. 31, 2024

(54) METHOD AND APPARATUS FOR ACTIVELY DEFENDING AGAINST BACKDOOR ATTACKS UNDER EDGE COMPUTING SCENARIO

(71) Applicant: Tsinghua University, Beijing (CN)

(72) Inventors: Ke Xu, Beijing (CN); Yi Zhao, Beijing (CN); Su Yao, Beijing (CN); Ziwei Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 422 days.

(21) Appl. No.: 17/523,474

(22) Filed: Nov. 10, 2021

(65) Prior Publication Data

US 2022/0222352 A1   Jul. 14, 2022

Related U.S. Application Data

(63) Continuation of application No. PCT/CN2021/081596, filed on Mar. 18, 2021.

(30) Foreign Application Priority Data

Jan. 13, 2021   (CN) .................... 202110042127.X (51) Int. Cl.
*G06F 21/57* (2013.01)
*G06F 21/54* (2013.01)
*G06N 3/12* (2023.01)

(52) U.S. Cl.
CPC ............ *G06F 21/577* (2013.01); *G06F 21/54* (2013.01); *G06N 3/12* (2013.01)

(58) Field of Classification Search
CPC ... G06F 21/577; G06F 21/54; H04L 63/1408; H04L 63/1416; H04L 63/1433
(Continued)

(56) References Cited

U.S. PATENT DOCUMENTS

2007/0192474 A1 * 8/2007 Decasper .............. H04L 67/306
  709/223
2020/0118039 A1 * 4/2020 Kocberber ............... G06N 5/01
(Continued)

FOREIGN PATENT DOCUMENTS

WO  WO-2020263389 A1 * 12/2020 ......... G06F 18/2433

*Primary Examiner* — Hee Soo Kim
(74) *Attorney, Agent, or Firm* — Hodgson Russ LLP (57) ABSTRACT

A method and an apparatus for actively defending against backdoor attacks under an edge computing scenario. The method includes: generating an initial optional operation set based on optional operations configured to enhance a model generalization ability, and constructing a configuration parameter set for each operation in the set; selecting a first subset with a curve between configuration parameters and model accuracies of the operation presenting a monotonically decreasing concave function characteristic; selecting a second subset with a curve of the operation between configuration parameters and probabilities that a model is successfully attacked by the backdoor attack presenting a monotonically decreasing convex function characteristic; constructing a mutation characteristic set for each operation in an intersection of the first and second subsets; and for each operation in the intersection, determining a final parameter setting value of the operation based on the mutation characteristic set, to actively defend against possible backdoor attacks.

19 Claims, 2 Drawing Sheets

(58) Field of Classification Search
USPC .......................................................... 726/25
See application file for complete search history.

(56) References Cited

U.S. PATENT DOCUMENTS

| | | | |
|---|---|---|---|
| 2021/0081831 A1* | 3/2021 | Angel | G06N 20/00 |
| 2021/0256125 A1* | 8/2021 | Miller | G06F 21/566 |
| 2021/0303695 A1* | 9/2021 | Grosse | G06N 3/08 |

* cited by examiner

METHOD AND APPARATUS FOR ACTIVELY DEFENDING AGAINST BACKDOOR ATTACKS UNDER EDGE COMPUTING SCENARIO

CROSS-REFERENCE TO RELATED APPLICATIONS

This disclosure is a continuation application of International Application No. PCT/CN2021/081596, filed on Mar. 18, 2021, which claims priority to Chinese Patent Application Serial No. 202110042127.X, filed on Jan. 13, 2021, the entire contents of which are incorporated herein by reference.

FIELD

The disclosure relates to a field of Internet security technologies, and particularly to a method and an apparatus for actively defending against backdoor attacks under the edge computing scenario.

BACKGROUND

In the related art, due to rapid development of mobile Internet and wireless communication technologies, relevant theories and technologies of the edge computing network have become mature, which further promotes wide popularization of the edge computing network. Moreover, a large number of network anomaly behaviors exist, such as traffic anomaly caused by the SYN flooding attack. In order to defend against possible attacks from the edge network, thereby reducing the risk of the backbone network being attacked, many deep learning based anomaly behavior detection models are deployed at edge nodes of the edge network. However, compared with the cloud, device resources of the edge nodes are limited, for example, having a poor computing performance and a low storage capability, which are difficult to meet the computing capability and data requirements required for deep learning training. Moreover, abnormal behavior samples that edge nodes can contact are limited, and the training data they possess may also contain privacy information that is not convenient to disclose. Through collaborative learning, each edge node in the edge computing network may not only reduce the requirements on data volume and computing capacity, but also does not need to disclose its own training data. The edge node only needs to share a trained model with other edge nodes, to obtain an intelligent model capable of processing all data samples (including training data owned by the edge node itself and training data owned by other edge nodes), thereby enjoying performance improvement brought by training data of other edge nodes.

However, since each edge node in the edge computing network is independent from other edge nodes, once it is attacked by a malicious attacker, other edge nodes cannot perceive it. In the absence of any perception by other edge nodes, an attacker can implant a backdoor into the deep learning model by modifying training data possessed by the attacked edge node, thereby achieving a backdoor attack. The backdoor attack herein refers to forming a trigger for the backdoor attack by tampering with a portion of features of training data, and modifying the label of training data to a particular error label. Subsequently, malicious attackers manipulates the attacked edge node and performs model training with the tampered data. After the model embedded in the backdoor is synchronized to other un-attacked edge nodes, deep learning models of other edge nodes will also be embedded in the backdoor. When no samples containing triggers are encountered, the deep learning model can work normally. However, when encountering a sample that contains a trigger, the model will output the wrong result specified by the attacker.

Therefore, the backdoor attack for collaborative learning under the edge computing scenario is very difficult to be detected.

SUMMARY

A first aspect of embodiments of the disclosure provides a method for actively defending against backdoor attacks under the edge computing scenario, including: generating an initial optional operation set based on optional operations configured to enhance a model generalization ability, and constructing a configuration parameter set for each optional operation in the initial optional operation set; selecting a first optional operation subset from the initial optional operation set, wherein for each optional operation in the first optional operation subset, a curve between configuration parameters and model accuracies presents a monotonically decreasing concave function characteristic; selecting a second optional operation subset from the initial optional operation set, wherein for each optional operation in the second optional operation subset, a curve between configuration parameters and probabilities that a model is successfully attacked by the backdoor attack presents a monotonically decreasing convex function characteristic; constructing a mutation characteristic set for each optional operation in an intersection of the first optional operation subset and the second optional operation subset according to a preset formula; and for each optional operation in the intersection of the first optional operation subset and the second optional operation subset, determining the final parameter setting value of the optional operation based on the mutation characteristic set, to actively defend against possible backdoor attacks.

A second aspect of embodiments of the disclosure provides an apparatus for actively defending against backdoor attacks under an edge computing scenario, including:
a processor; and
a memory, configured to store instructions executable by the processor,
wherein the processor is configured to implement a method for actively defending against backdoor attacks under an edge computing scenario by executing the instructions stored in the memory, the method comprising:
generating an initial optional operation set based on optional operations configured to enhance a model generalization ability, and constructing a configuration parameter set for each optional operation in the initial optional operation set;
selecting a first optional operation subset from the initial optional operation set, wherein for each optional operation in the first optional operation subset, a curve between configuration parameters and model accuracies presents a monotonically decreasing concave function characteristic;
selecting a second optional operation subset from the initial optional operation set, wherein for each optional operation in the second optional operation subset, a curve between configuration parameters and probabilities that a model is successfully attacked by the backdoor attack presents a monotonically decreasing convex function characteristic;

constructing a mutation characteristic set for each optional operation in an intersection of the first optional operation subset and the second optional operation subset according to a preset formula; and for each optional operation in the intersection of the first optional operation subset and the second optional operation subset, determining a final parameter setting value of the optional operation based on the mutation characteristic set, to actively defend against possible backdoor attacks.

A third aspect of embodiments of the disclosure provides a non-transitory computer readable storage medium stored with computer instructions thereon. The computer instructions are configured to cause a computer to implement the method for actively defending against backdoor attacks under the edge computing scenario described in foregoing embodiments.

Additional aspects and advantages of the present disclosure will be given in the following description, and some of them will become apparent from the following description or be known through the practice of the present disclosure.

BRIEF DESCRIPTION OF THE DRAWINGS

These and other aspects and advantages of the disclosure will become apparent and more readily appreciated from the following descriptions taken in conjunction with the drawings as described below, in which.

EMBODIMENTS OF THE PRESENT DISCLOSURE

The present disclosure will be further described in detail below with reference to the accompanying drawings and embodiments. Same or similar reference numbers throughout the specification indicate same or similar elements or element having same or similar functions. It should be understood that the specific embodiments described herein are only used to explain the present disclosure, and should not be understood as limitation to the present disclosure.

In the following, a method and an apparatus for actively defending against backdoor attacks under an edge computing scenario according to embodiments of the present disclosure will be described in detail with reference to drawings. First, the method for actively defending against backdoor attacks under the edge computing scenario according to embodiments of the present disclosure will be described in detail with reference to drawings.

Figure 1:
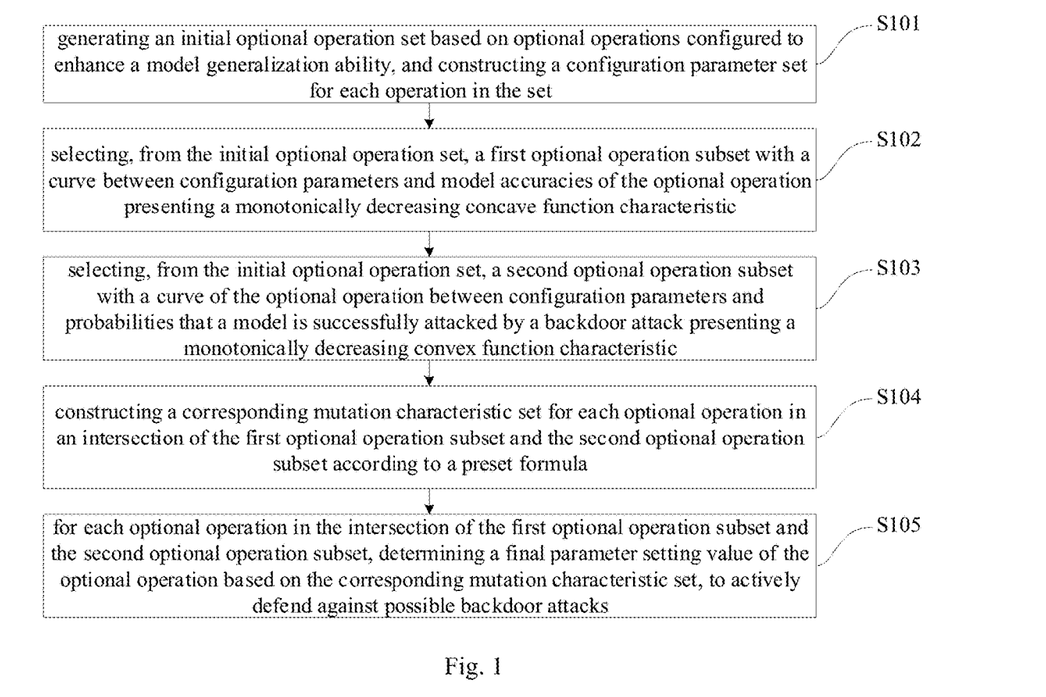
FIG. 1 is a flowchart of a method for actively defending against backdoor attacks under an edge computing scenario according to an embodiment of the present disclosure.

FIG. 1 is a flowchart of a method for actively defending against backdoor attacks under the edge computing scenario according to an embodiment of the present disclosure.

As illustrated in FIG. 1, the method for actively defending against backdoor attacks under the edge computing scenario includes following steps.

At step S101, an initial optional operation set is generated based on optional operations configured to enhance a model generalization ability, and a configuration parameter set is constructed for each operation in the set.

As a possible implementation, embodiments of the disclosure are mainly used in a system in which multiple edge nodes achieve network intelligentization through collaborative learning under the edge computing scenario. Therefore, in view of the current situation that the deep learning model has a variety of optional operations to improve the generalization ability of the model, in embodiments of the disclosure, an initial optional operation set is firstly formed by selected optional operations configured to improve the model generalization ability, and a configuration parameter set is constructed for each operation in the set.

Optionally, in an embodiment of the disclosure, generating the initial optional operation set based on optional operations configured to enhance the model generalization ability, and constructing the configuration parameter set for each operation in the set, includes: constructing the initial optional operation set related to the model generalization capacity; and constructing the configuration parameter set of each optional operation. Subsequently, in embodiments of the disclosure, multiple models are trained for each optional operation with different configuration parameters.

For example, at step S1, it is considered that there are many optional operations in the deep learning model to improve the generalization ability of the model, and the generalization ability of the deep learning model will also change with the change of configuration parameters of the optional operations. Optionally, the optional operations used to improve the model generalization ability are formed into the initial optional operation set, and the configuration parameter set is built for each operation in the set.

In actual implementation, S1 may include followings.

At step S11, the initial optional operation set related to the model generalization ability is constructed. When training the deep learning model, there are a number of optional operations, such as dropout (a certain percentage of network structure is not updated during training), regularization, and gradient clipping. Optionally, N optional operations related to the model generalization ability are formed into the initial optional operation set, represented by $P=\{p_1, p_2, \ldots p_i, p_{i+1}, \ldots, p_{N-1}, p_N\}$.

At step S12, the configuration parameter set is constructed for each optional operation. For each optional operation $p_i$ in P, there is an optional parameter configuration range, represented by $L=\{l_{min}^i, l_{max}^i\}$, where $l_{min}^i < l_{max}^i$, $l_{min}^i$ is the minimum optional configuration parameter and $l_{max}^i$ is the maximum optional configuration parameter. Within the optional parameter configuration range, K+2 parameters (including $l_{min}^i$ and $l_{max}^i$) are evenly selected, that is, the parameter interval can be expressed as $s_i$, the specific calculation method of which is as follows:

$$s_i = \frac{l_{max}^i - l_{min}^i}{K+1}.$$

Finally, for each optional operation $p_i$, there is a configuration parameter set, represented by $E_i=\{e_1^i, e_2^i, \ldots, e_j^i, e_{j+1}^i, \ldots, e_{K+1}^i, e_{K+2}^i\}$, where $e_j^i = l_{min}^i + s_i \times (j-1)$.

At step S102, a first optional operation subset with a curve between configuration parameters and model accuracies of the optional operation presenting a monotonically decreasing concave function characteristic is selected from the initial optional operation set.

It could be understood that, in terms of configuration parameters and model accuracies, the subset of optional operations that conform to the monotone decreasing concave function characteristic is selected.

Optionally, in an embodiment of the disclosure, selecting, from the initial optional operation set, the first optional operation subset with the curve between configuration parameters and model accuracies of the optional operation presenting the monotonically decreasing concave function characteristic, includes: constructing a two-tuple set of configuration parameters and model accuracies; and selecting a subset of optional operations conforming to a preset monotonically decreasing concave function characteristic.

For example, at step S2, the subset of optional operations whose curve between configuration parameters and model accuracies represent a monotonically decreasing concave function characteristic is selected.

In actual execution, step S2 may include followings.

At step S21, a two-tuple set of configuration parameters and model accuracies is constructed. For each optional operation $p_i$ in the optional operation set P, the model is trained using each element $e_j^i$ in the corresponding configuration parameter set $E_i$. After training, the model is tested to obtain the accuracy $h_j^i$, such that the two-tuple of configuration parameter and model accuracy, i.e., $(e_j^i, h_j^i)$ is constructed. All the two-tuples of respective optional operations $p_i$ form the set, i.e., $F_i = \{(e_1^i, h_1^i), (e_2^i, h_2^i), \ldots, (e_j^i, h_j^i), (e_{j+1}^i, h_{j+1}^i), \ldots, (e_{K+1}^i, h_{K+1}^i), (e_{K+2}^i, h_{K+2}^i)\}$.

At step S22, the subset of optional operations conforming to the monotonically decreasing concave function characteristic is selected. For each optional operation $p_i$ in the optional operation set P, the curve between configuration parameters and model accuracies is constructed using its two-tuple set $F_i$, and then an approximate curvilinear function $f_i$ is obtained through fitting. All the operations $p_i$ corresponding to the curvilinear function $f_i$ conforming to the monotonically decreasing concave function characteristic form a particular subset, represented by $$P_A = \left\{ p_i \mid f_i\left(\frac{x_1 + x_2}{2}\right) > \frac{f_i(x_1) + f_i(x_2)}{2}, \right.$$

and $f_i(x_1) > f_i(x_2)$, and $x_1 < x_2\}$, where, $P_A \subseteq P$. Here, $x_1$ and $x_2$ are only to illustrate the monotonicity and concavity of the function, and has no practical significance.

At step S103, a second optional operation subset with a curve of the optional operation between configuration parameters and probabilities that a model is successfully attacked by the backdoor attack presenting a monotonically decreasing convex function characteristic is selected from the initial optional operation set.

It could be understood that, in embodiments of the disclosure, in terms of configuration parameters and probabilities that the model is successfully attacked by the backdoor attack, the subset of optional operations that conform to the monotone decreasing convex function characteristic is selected.

Optionally, in an embodiment of the disclosure, selecting, from the initial optional operation set, the second optional operation subset with a curve of the optional operation between configuration parameters and probabilities that a model is successfully attacked by the backdoor attack presenting a monotonically decreasing convex function characteristic, includes: constructing a two-tuple set of configuration parameters and probabilities that the model is successfully attacked; and selecting a subset of optional operations conforming to a preset monotonically decreasing convex function characteristic.

For example, at step S3, the subset of optional operations whose curve between configuration parameters and probabilities that the model is successfully attacked by the backdoor attack represent a monotonically decreasing convex function characteristic is selected.

In actual execution, step S3 may include followings.

At step S31, a two-tuple set of configuration parameters and probabilities that the model is successfully attacked by the backdoor attack is constructed. Here, the probability that the model is successfully attacked by the backdoor attack refers to the probability that the model incorrectly identifies a sample with the backdoor attack trigger. For each optional operation $p_i$ in the optional operation set P, the model is trained using each element $e_j^i$ in the corresponding configuration parameter set $E_i$. After training, the model is tested using the sample with the backdoor attack trigger to obtain the accuracy $\tilde{h}_j^i$, such that the two-tuple set of configuration parameters and probabilities that the model is successfully attacked by the backdoor attack, i.e., $(e_j^i, \tilde{h}_j^i)$ is constructed. All the two-tuple sets of respective optional operations $p_i$ form the set, i.e., $G_i = \{(e_1^i, \tilde{h}_1^i), (e_2^i, \tilde{h}_2^i), \ldots, (e_j^i, \tilde{h}_j^i), (e_{j+1}^i, \tilde{h}_{j+1}^i), \ldots, (e_{K+1}^i, \tilde{h}_{K+1}^i), (e_{K+2}^i, \tilde{h}_{K+2}^i)\}$.

At step S32, the subset of optional operations conforming to the monotonically decreasing convex function characteristic is selected. For each optional operation $p_i$ in the optional operation set P, the curve between configuration parameters and probabilities that the model is successfully attacked by the backdoor attack is constructed using its two-tuple set $G_i$, and then an approximate curvilinear function $g_i$ is obtained through fitting. All the operations $p_i$ corresponding to the curvilinear function $g_i$ conforming to the monotonically decreasing concave function characteristic form a particular subset, represented by $$P_B = \left\{ p_i \mid g_i\left(\frac{x_1 + x_2}{2}\right) < \frac{g_i(x_1) + g_i(x_2)}{2}, \right.$$

and $g_i(x_1) > g_i(x_2)$, and $x_1 < x_2\}$, where, $P_B \subseteq P$. Here, $x_1$ and $x_2$ are only to illustrate the monotonicity and concavity of the function, and has no practical significance.

At step S104, a corresponding mutation characteristic set is constructed for each optional operation in an intersection of the first optional operation subset and the second optional operation subset according to a preset formula.

That is, in embodiments of the disclosure, after an intersection of the two subsets is obtained, a new and finally selected optional operation set for actively defending against possible backdoor attacks is formed.

Optionally, in an embodiment of the disclosure, constructing the corresponding mutation characteristic set for each optional operation in the intersection of the first optional operation subset and the second optional operation subset according to the preset formula, includes: constructing a finally selected optional operation set; for each operation in the finally selected optional operation set, constructing a two-tuple set of configuration parameters and model generalization error upper bounds; and constructing the corresponding mutation characteristic set for each operation of the finally selected optional operation set.

For example, at step S4, according to a specified formula, for each optional operation in the intersection of two subsets obtained in steps S2 and S3, the mutation characteristic set is constructed.

In actual implementation, step S4 may include followings.

At step S41, a finally selected optional operation set is constructed. After steps S2 and S3 are completed, the intersection of the two subsets obtained from the two steps is taken, i.e., $P'=P_A \cap P_B$.

At step S42, for each operation in the finally selected optional operation set $p_i \in P'$, a two-tuple set of configuration parameters and model generalization error upper bounds is constructed. Here, the model generalization error upper bound can express the generalization ability of the model. In detail, optionally, there is a benign dataset $D_{benign}$, in which each sample does not include any backdoor attack trigger. Optionally, a certain percentage of samples are taken from $D_{benign}$, to form a benign subset $D'_{benign}$, where $D'_{benign} \subset D_{benign}$. For the benign subset $D'_{benign}$, each sample is added with a backdoor attack trigger, and the true label is tampered, such that a backdoor attacked subset $D'_{backdoor}$ is formed. Two datasets for training $D_1=D_{benign}\backslash D'_{benign}$ and $D_2=(D_{benign}\backslash D'_{benign}) \cup D'_{backdoor}$ are constructed. Two models $M_1$ and $M_2$ are trained respectively based on the two datasets $D_1$ and $D_2$. For each sample in the dataset $D_2$, i.e., $d \in D_2$, an absolute value of a difference between losses $loss_1^d$ and $loss_2^d$ of the sample on the two trained models $M_1$ and $M_2$ is calculated, i.e., $\varphi^d=|loss_1^d-loss_2^d|$. The model generalization error upper bound may be expressed as $\phi$, which may be calculated as:

$$\phi=\max \varphi^d, \forall d \in D_2.$$

For each operation in the optional operation set $P'$, $p_i \in P'$, the model generalization error upper bound $\phi_j^i$ is calculated using each element $e_j^i$ in the corresponding configuration parameter set $E_i$, such that the two-tuple of the configuration parameter and the model generalization error upper bound, i.e., $(e_j^i, \phi_j^i)$ is constructed. All two-tuples of the optional operations $p_i \in P'$ form a set, i.e., $V_i=\{v_1^i=(e_1^i, \phi_1^i), v_2^i=(e_2^i, \phi_2^i), \ldots, v_j^i=(e_j^i, \phi_j^i), v_{j+1}^i=(e_{j+1}^i, \phi_{j+1}^i), \ldots, v_{K+1}^i=(e_{K+1}^i, \phi_{K+1}^i), v_{K+2}^i=(e_{K+2}^i, \phi_{K+2}^i)\}$.

At step S43, for each operation in the finally selected optional operation set, the mutation characteristic set is constructed. For each element in $V_i$, i.e., $v_j^i \in V_i$, the mutation characteristic of the two-tuple is defined as $w_j^i$ which is specifically calculated as follows:

$$w_j^i = \begin{cases} \dfrac{|\phi_j^i - \phi_{j+\Delta}^i|}{e_j^i - e_{j+\Delta}^i}, & j+\Delta \leq K+2 \\ 0, & \text{otherwise} \end{cases}$$

where, $\Delta$ is an integer hyper-parameter greater than or equal to 1. Thus, the mutation characteristic set of the optional operation $p_i \in P'$ corresponding to $V_i$ is $W_i=\{w_1^i, w_2^i, \ldots, w_j^i, w_{j+1}^i, \ldots, w_{K+1}^i, w_{K+2}^i\}$. j gradually increases from 1.

At step 105, for each optional operation in the intersection of the first optional operation subset and the second optional operation subset, a final parameter setting value of the optional operation is determined based on the corresponding mutation characteristic set, to actively defend against possible backdoor attacks.

In conclusion, in embodiments of the disclosure, for each optional operation in the intersection of the first optional operation subset and the second optional operation subset, the corresponding mutation characteristic set is constructed based on the model generalization error upper bound, such that based on the relations between the elements in the mutation characteristic set and a preset threshold, the final parameter setting value is determined for each optional operation, to actively defend against possible backdoor attacks.

It should be noted that, the preset threshold may be set by those skilled in the art according to actual situation, which is not specifically limited here.

Embodiments of the disclosure neither require the cooperation of other edge nodes, nor need to know whether other edge nodes have been attacked by the backdoor attack, which can effectively improve the network security under the edge computing scenario, and has far-reaching significance for practical deployment and application.

Optionally, in an embodiment of the disclosure, for each optional operation in the intersection of the first optional operation subset and the second optional operation subset, determining a final parameter setting value of the optional operation based on the corresponding mutation characteristic set, includes: for the mutation characteristic set associated with each optional operation in the intersection of the first optional operation subset and the second optional operation subset, gradually increasing according to a preset strategy, and for each collaborative learning edge node under an edge computing scenario, when training a model, setting a parameter of each finally selected optional operation to the final parameter setting value.

For example, at step S5, based on the mutation characteristic set $w_i$ associated with each finally selected optional operation $p_i \in P'$ determined in step S4, the final parameter setting value for the optional operation $p_i \in P'$ is determined, to actively defend against the possible backdoor attack.

In actual implementation, step S5 may include followings.

At step S51, for the mutation characteristic set $w_i$ associated with each finally selected optional operation $p_i \in P'$, optionally, in terms of j starting from 1 and gradually increasing in the unit of 1, $w_j^i$ is compared with the manually set threshold $\sigma$. Once $w_j^i > \sigma$, the comparison is stopped, and the parameter value $e_j^i$ corresponding to $w_j^i$ at this point is recorded, which is optionally expressed as $\eta_i$.

At step S52, for each collaborative learning edge node under the edge computing scenario, when training a model, the parameter of each finally selected optional operation $p_i \in P'$ is set to $\eta_i$, to actively defend against the possible backdoor attack.

It should be understood by those skilled in the art that, considering that the stability of the deep learning model is related to the success probability of backdoor attack, embodiments of the disclosure can analyze the stability of the deep learning model under the edge computing scenario. Subsequently, according to the results of stability analysis, the hyperparameter corresponding to the inflection point of model generalization ability can be found in embodiments of the disclosure according to the formula. The inflection point mentioned here has the following characteristics. When the value of the hyperparameter is less than the hyperparameter corresponding to the inflection point, the accuracy of the deep learning model under the edge computing scenario decreases slowly with the increase of the hyperparameter, but the probability of the deep learning model being embedded with an effective backdoor decreases obviously. When the value of the hyperparameter is greater than that corresponding to the inflection point, with the increase of the hyperparameter, the accuracy of the deep learning model under the edge computing scenario decreases obviously, but the probability of the deep learning model being embedded with an effective backdoor decreases slowly. Without human intervention, the method can find the qualified hyperparameter according to the specific formula to actively defend against collaborative learning-oriented backdoor attacks under the edge computing scenarios. Moreover, embodiments of the disclosure neither require the cooperation of other edge nodes, nor need to know which edge nodes are manipulated as malicious edge nodes by attackers. In general, this method and apparatus have the characteristics of high stability and strong defense ability in active defense against collaborative learning-oriented backdoor attack under the edge computing scenarios, and are more suitable for deployment and application in real-world scenarios.

In conclusion, the wide deployment of edge computing networks promotes the further development of collaborative learning among edge nodes. However, each edge node cannot know whether the training data of other edge nodes is tampered by malicious attackers and evolved into samples with backdoor attack trigger. Under such a scenario, the backdoor attack can spread from one or more edge nodes controlled by malicious attackers to other benign edge nodes, so that the deep learning models of all edge nodes participating in collaborative learning are embedded with the backdoor. This will cause the deep learning model to exhibit the wrong behavior expected by attackers when it encounters samples with backdoor attack trigger, bringing potential security risks to edge nodes, edge computing networks where edge nodes reside and related devices. Under the scenario such as network anomaly (SYN Flooding attack) detection, when edge nodes are inserted with the backdoor, huge economic losses will be caused and national security may be compromised. Backdoor attacks for collaborative learning under the edge computing scenarios are difficult to detect, and only when they encounter specific backdoor attack trigger, they will show malicious behavior. Therefore, an active defense method and device for backdoor attacks under the edge computing scenarios are proposed to effectively defend against potential backdoor attacks.

Embodiments of the disclosure solve the problem that it is difficult to detect backdoor attacks under edge computing scenarios. Moreover, each edge node can independently actively defend against collaborative learning-oriented backdoor attack under edge computing scenarios according to the invention, without requiring the cooperation between edge nodes for common defense, and without knowing whether any edge node has been controlled by malicious attackers. In addition, the scheme does not need to rely on human intervention, and each edge node automatically deploys defense according to the invention after configuring the hyperparameters required by the invention.

The method for actively defending against backdoor attacks under the edge computing scenario provided by embodiments of the disclosure may find a qualified hyperparameter according to a specific formula to actively defend against collaborative learning-oriented backdoor attacks under the edge computing scenario without human intervention, and the method neither requires the cooperation of other edge nodes nor needs to know which edge nodes are manipulated by an attacker as malicious edge nodes. In the aspect of actively defending against collaborative learning-oriented backdoor attacks under an edge computing scenario, the method is characterized by high stability and strong defending capability, which effectively improves network security under the edge computing scenario, and is more suitable for deployment and application of a real-world scenarios.

Next, an apparatus for actively defending against backdoor attacks under the edge computing scenario according to embodiments of the present disclosure will be described in detail with reference to drawings.

Figure 2:
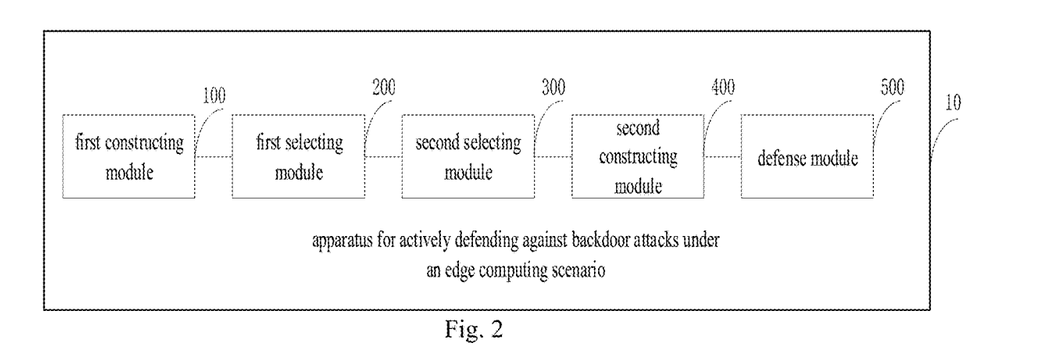
FIG. 2 is a block diagram of an apparatus for actively defending against backdoor attacks under an edge computing scenario according to an embodiment of the present disclosure.

FIG. 2 is a block diagram of an apparatus for actively defending against backdoor attacks under the edge computing scenario according to an embodiment of the present disclosure.

As illustrated in FIG. 2, the apparatus 10 for actively defending against backdoor attacks under the edge computing scenario includes a first constructing module 100, a first selecting module 200, a second selecting module 300, a second constructing module 400 and a defense module 500.

The first constructing module 100 is configured to generate an initial optional operation set based on optional operations configured to enhance a model generalization ability, and construct a configuration parameter set for each operation in the set.

The first selecting module 200 is configured to select, from the initial optional operation set, a first optional operation subset with a curve between configuration parameters and model accuracies of the optional operation presenting a monotonically decreasing concave function characteristic.

The second selecting module 300 is configured to select, from the initial optional operation set, a second optional operation subset with a curve of the optional operation between configuration parameters and probabilities that a model is successfully attacked by the backdoor attack presenting a monotonically decreasing convex function characteristic.

The second constructing module 400 is configured to construct a corresponding mutation characteristic set for each optional operation in an intersection of the first optional operation subset and the second optional operation subset according to a preset formula.

The defense module 500 is configured to, for each optional operation in the intersection of the first optional operation subset and the second optional operation subset, determine a final parameter setting value of the optional operation based on the corresponding mutation characteristic set, to actively defend against possible backdoor attack.

In an embodiment of the disclosure, the defense module 500 is specifically configured to: for the mutation characteristic set associated with each optional operation in the intersection of the first optional operation subset and the second optional operation subset, gradually increase according to a preset strategy, and determine the final parameter setting value when detecting greater than a preset threshold; and for each collaborative learning edge node under the edge computing scenario, when training a model, set a parameter of each finally selected optional operation to the final parameter setting value.

It should be noted that, the foregoing description of the method embodiments for actively defending against backdoor attacks under the edge computing scenario also applies to the apparatus for actively defending against backdoor attacks under the edge computing scenario in this embodiment, which will not be elaborated here.

The apparatus for actively defending against backdoor attacks under the edge computing scenario provided by embodiments of the disclosure may find a qualified hyperparameter according to a specific formula to actively defend against collaborative learning-oriented backdoor attacks under an edge computing scenario without human intervention, and the apparatus neither requires the cooperation of other edge nodes nor needs to know which edge nodes are manipulated by an attacker as malicious edge nodes. In the aspect of actively defending against collaborative learning-oriented backdoor attacks under the edge computing scenario, the apparatus is characterized by high stability and strong defending capability, which effectively improves network security under the edge computing scenario, and is more suitable for deployment and application of real-world scenarios.

Figure 3:
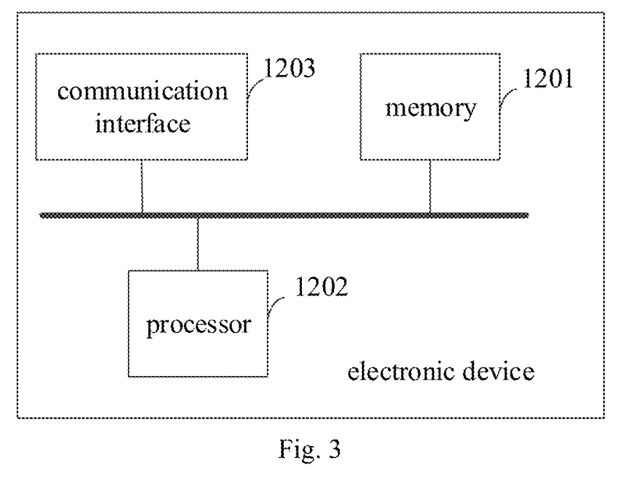
FIG. 3 is a schematic diagram of an electronic device according to an embodiment of the present disclosure.

FIG. 3 is a block diagram of an electronic device according to an embodiment of the present disclosure. The electronic device may include a memory 1201, a processor 1202 and a computer program stored in the memory 1201 and runnable on the processor 1202.

The processor 1202 is configured to implement the method for actively defending against backdoor attacks under the edge computing scenario provided by foregoing embodiments by executing the program.

Further, the electronic device further includes a communication interface 1203 configured for communication between the memory 1201 and the processor 1202.

The memory 1201 is configured to store the computer program that can run on the processor 1202.

The memory 1201 may include high speed RAM memory, or may also include non-volatile memory, such as at least one disk memory.

If the memory 1201, the processor 1202, and the communication interface 1203 are implemented independently, the communication interface 1203, the memory 1201, and the processor 1202 can be connected to each other and communicate with each other through the bus. A bus may be an Industry Standard Architecture (ISA) bus, a Peripheral Component Interconnect (PCI) bus or an Extended Industry Standard Architecture (EISA) bus, etc. The bus may be divided into address bus, data bus, control bus and so on. For ease of representation, a single thick line is used in FIG. 3, but it does not mean that there is only one bus or one type of bus.

Optionally, in terms of implementation, if the memory 1201, the processor 1202 and the communication interface 1203 are integrated on a single chip, the memory 1201, the processor 1202 and the communication interface 1203 can communicate with each other through internal interfaces.

The processor 1202 may be a Central Processing Unit (CPU), or an Application Specific Integrated Circuit (ASIC), or one or more integrated circuits configured to implement embodiments of the disclosure.

Embodiments of the disclosure further provide a computer readable storage medium stored thereon with a computer program. When the program is executed by a processor, the method for actively defending against backdoor attacks under an edge computing scenario described above is implemented.

Moreover, terms of "a first" and "a second" are only used for description and cannot be seen as indicating or implying relative importance or implying the number of technical features referred to. Thus, a feature defined with "a first" and "a second" may indicate or imply including at least one the feature. In the description of the specification, "a plurality of" means more than two, for example, two, three, and the like, unless otherwise stipulated and restricted.

Reference throughout this specification to "an embodiment", "some embodiments", "one schematic embodiment", "an example", "a specific examples", or "some examples" means that a particular feature, structure, material, or characteristic described in connection with the embodiment or example is included in at least one embodiment or example of the disclosure. Thus, the appearances of the phrases such as "in some embodiments", "in one embodiment", "in an embodiment", "an example", "a specific examples", or "some examples" in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be understood that above embodiment are exemplary, and shall not be understood as limitation to the present disclosure, and it would be appreciated by those skilled in the art that changes, alternatives, and modifications may be made in the embodiments within the scope of the disclosure.

What is claimed is:

1. A method for actively defending against backdoor attacks under an edge computing scenario, performed by a collaborative learning edge node under the edge computing scenario, the edge node being deployed a deep learning model, the method comprising:
   generating an initial optional operation set based on optional operations configured to enhance a model generalization ability, and constructing a configuration parameter set for each optional operation in the initial optional operation set;
   selecting a first optional operation subset from the initial optional operation set, wherein for each optional operation in the first optional operation subset, a curve between configuration parameters and model accuracies presents a monotonically decreasing concave function characteristic;
   selecting a second optional operation subset from the initial optional operation set, wherein for each optional operation in the second optional operation subset, a curve between configuration parameters and probabilities that the deep learning model is successfully attacked by the backdoor attack presents a monotonically decreasing convex function characteristic;
   constructing a mutation characteristic set for each optional operation in an intersection of the first optional operation subset and the second optional operation subset according to a preset formula;
   for each optional operation in the intersection of the first optional operation subset and the second optional operation subset, determining a final parameter setting value of the optional operation based on the mutation characteristic set; and
   actively defending against possible backdoor attacks by training and using the deep learning model with a parameter of the optional operation being set to the final parameter setting value, wherein the final parameter setting value decreases a probability of the deep learning model being embedded with an effective backdoor.

2. The method of claim 1, wherein, constructing the configuration parameter set for each optional operation in the initial optional operation set, comprises:
   for each optional operation in the initial optional operation set, selecting K+2 parameters evenly from an optional parameter configuration range $L=\{l_{min}^{i}, l_{max}^{i}\}$ of the optional operation, where $l_{min}^{i} < l_{max}^{i}$, $l_{min}^{i}$ is the minimum optional configuration parameter and $l_{max}^{i}$ is the maximum optional configuration parameter, and the K+2 parameters include $l_{min}^{i}$ and $l_{max}^{i}$, and K is an integer greater than or equal to 0.

3. The method of claim 1, wherein, selecting the first optional operation subset from the initial optional operation set comprises:

for each optional operation in the initial optional operation set, constructing a two-tuple set of configuration parameters and model accuracies;

for each optional operation in the initial optional operation set, constructing the curve between configuration parameters and model accuracies using the two-tuple set, and generating an approximate curvilinear function by fitting; and selecting a subset of optional operations corresponding to the curvilinear functions conforming to a preset monotonically decreasing concave function characteristic, as the first optional operation subset.

4. The method of claim 3, wherein for each optional operation in the initial optional operation set, constructing a two-tuple set of configuration parameters and model accuracies, comprises:

for each optional operation in the initial optional operation set, training the model using each configuration parameter in the configuration parameter set corresponding to the optional operation;

testing the model after training the model to obtain the model accuracy;

constructing a two-tuple between the configuration parameter and the model accuracy; and forming the two-tuple set with respective two-tuples corresponding to respective configuration parameters.

5. The method of claim 1, wherein, selecting the second optional operation subset from the initial optional operation set comprises:

for each optional operation in the initial optional operation set, constructing a two-tuple set of configuration parameters and probabilities that the model is successfully attacked;

for each optional operation in the initial optional operation set, constructing the curve between configuration parameters and probabilities that the model is successfully attacked using the two-tuple set, and generating an approximate curvilinear function by fitting; and selecting a subset of optional operations corresponding to the curvilinear functions conforming to a preset monotonically decreasing convex function characteristic, as the second optional operation subset.

6. The method of claim 5, wherein for each optional operation in the initial optional operation set, constructing a two-tuple set of configuration parameters and probabilities that the model is successfully attacked, comprises:

for each optional operation in the initial optional operation set, training the model using each configuration parameter in the configuration parameter set corresponding to the optional operation;

testing the model using samples with a backdoor attack trigger after training the model, to obtain the probability that the model is successfully attacked;

constructing a two-tuple between the configuration parameter and the probability that the model is successfully attacked; and forming the two-tuple set with respective two-tuples corresponding to respective configuration parameters.

7. The method of claim 1, wherein, constructing the mutation characteristic set for each optional operation in the intersection of the first optional operation subset and the second optional operation subset according to the preset formula, comprises:

constructing a finally selected optional operation set, wherein the finally selected optional operation set is the intersection of the first optional operation subset and the second optional operation subset;

for each operation in the finally selected optional operation set, constructing a two-tuple set of configuration parameters and model generalization error upper bounds; and constructing the mutation characteristic set for each operation in the finally selected optional operation set based on the two-tuple set.

8. The method of claim 7, wherein constructing the mutation characteristic set for each operation in the finally selected optional operation set based on the two-tuple set comprises:

for each two-tuple in the two-tuple set, defining the mutation characteristic according to a formula of $$w_j^i = \begin{cases} \dfrac{|\phi_j^i - \phi_{j+\Delta}^i|}{e_j^i - e_{j+\Delta}^i}, & j + \Delta \le K + 2 \\ 0, & \text{otherwise} \end{cases}$$

where,
$V_i = \{v_1^i = (e_1^i, \phi_1^i),\ v_2^i = (e_2^i, \phi_2^i),\ \ldots,\ v_j^i = (e_j^i, \phi_j^i),\ v_{j+1}^i = (e_{j+1}^i, \phi_{j+1}^i),\ \ldots,\ v_{K+1}^i = (e_{K+1}^i, \phi_{K+1}^i),\ v_{K+2}^i = (e_{K+2}^i, \phi_{K+2}^i)\}$ is the set of all two-tuples, $\phi_j^i$ is the model generalization error upper bound, $e_j^i$ is the configuration parameter in the configuration parameter set corresponding to the operation, $\Delta$ is an integer hyper-parameter greater than or equal to 1, and K is an integer greater than or equal to 0; and constructing the mutation characteristic set as $W_i = \{w_1^i, w_2^i, \ldots, w_j^i, w_{j+1}^i, \ldots, w_{K+1}^i, w_{K+2}^i\}$.

9. The method of claim 8, wherein, for each optional operation in the intersection of the first optional operation subset and the second optional operation subset, determining a final parameter setting value of the optional operation based on the corresponding mutation characteristic set, comprises:

for the mutation characteristic set associated with each optional operation in the intersection of the first optional operation subset and the second optional operation subset, comparing $w_j^i$ with a preset threshold starting from j=1 and gradually increasing by 1; and determining the parameter value corresponding to $w_j^i$ in response to $w_j^i$ being greater than the preset threshold, as the final parameter setting value.

10. An apparatus for actively defending against backdoor attacks under an edge computing scenario, applied to a collaborative learning edge node under the edge computing scenario, the edge node being deployed a deep learning model, the apparatus comprising:

a processor; and a memory, configured to store instructions executable by the processor, wherein the processor is configured to implement a method for actively defending against backdoor attacks under an edge computing scenario by executing the instructions stored in the memory, the method comprising:

generating an initial optional operation set based on optional operations configured to enhance a model generalization ability, and constructing a configuration parameter set for each optional operation in the initial optional operation set;

selecting a first optional operation subset from the initial optional operation set, wherein for each optional operation in the first optional operation subset, a curve between configuration parameters and model accuracies presents a monotonically decreasing concave function characteristic;

selecting a second optional operation subset from the initial optional operation set, wherein for each optional operation in the second optional operation subset, a curve between configuration parameters and probabilities that the deep learning model is successfully attacked by a backdoor attack presents a monotonically decreasing convex function characteristic;

constructing a mutation characteristic set for each optional operation in an intersection of the first optional operation subset and the second optional operation subset according to a preset formula;

for each optional operation in the intersection of the first optional operation subset and the second optional operation subset, determining a final parameter setting value of the optional operation based on the mutation characteristic set; and actively defending against possible backdoor attacks by training and using the deep learning model with a parameter of the optional operation being set to the final parameter setting value, wherein the final parameter setting value decreases a probability of the deep learning model being embedded with an effective backdoor.

11. The apparatus of claim 10, wherein, constructing the configuration parameter set for each optional operation in the initial optional operation set, comprises:

for each optional operation in the initial optional operation set, selecting K+2 parameters evenly from an optional parameter configuration range $L=\{l_{min}^i, l_{max}^i\}$ of the optional operation, where $l_{min}^i < l_{max}^i$, $l_{min}^i$ is the minimum optional configuration parameter and $l_{max}^i$ is the maximum optional configuration parameter, and the K+2 parameters include $l_{min}^i$ and $l_{max}^i$, and K is an integer greater than or equal to 0.

12. The apparatus of claim 10, wherein, selecting the first optional operation subset from the initial optional operation set comprises:

for each optional operation in the initial optional operation set, constructing a two-tuple set of configuration parameters and model accuracies;

for each optional operation in the initial optional operation set, constructing the curve between configuration parameters and model accuracies using the two-tuple set, and generating an approximate curvilinear function by fitting; and selecting a subset of optional operations corresponding to the curvilinear functions conforming to a preset monotonically decreasing concave function characteristic, as the first optional operation subset.

13. The apparatus of claim 12, wherein for each optional operation in the initial optional operation set, constructing a two-tuple set of configuration parameters and model accuracies, comprises:

for each optional operation in the initial optional operation set, training the model using each configuration parameter in the configuration parameter set corresponding to the optional operation;

testing the model after training the model to obtain the model accuracy;

constructing a two-tuple between the configuration parameter and the model accuracy; and forming the two-tuple set with respective two-tuples corresponding to respective configuration parameters.

14. The apparatus of claim 10, wherein, selecting the second optional operation subset from the initial optional operation set comprises:

for each optional operation in the initial optional operation set, constructing a two-tuple set of configuration parameters and probabilities that the model is successfully attacked;

for each optional operation in the initial optional operation set, constructing the curve between configuration parameters and probabilities that the model is successfully attacked using the two-tuple set, and generating an approximate curvilinear function by fitting; and selecting a subset of optional operations corresponding to the curvilinear functions conforming to a preset monotonically decreasing convex function characteristic, as the second optional operation subset.

15. The apparatus of claim 14, wherein for each optional operation in the initial optional operation set, constructing a two-tuple set of configuration parameters and probabilities that the model is successfully attacked, comprises:

for each optional operation in the initial optional operation set, training the model using each configuration parameter in the configuration parameter set corresponding to the optional operation;

testing the model using samples with a backdoor attack trigger after training the model, to obtain the probability that the model is successfully attacked;

constructing a two-tuple between the configuration parameter and the probability that the model is successfully attacked; and forming the two-tuple set with respective two-tuples corresponding to respective configuration parameters.

16. The apparatus of claim 10, wherein, constructing the mutation characteristic set for each optional operation in the intersection of the first optional operation subset and the second optional operation subset according to the preset formula, comprises:

constructing a finally selected optional operation set, wherein the finally selected optional operation set is the intersection of the first optional operation subset and the second optional operation subset;

for each operation in the finally selected optional operation set, constructing a two-tuple set of configuration parameters and model generalization error upper bounds; and constructing the mutation characteristic set for each operation in the finally selected optional operation set based on the two-tuple set.

17. The apparatus of claim 16, wherein constructing the mutation characteristic set for each operation in the finally selected optional operation set based on the two-tuple set comprises:

for each two-tuple in the two-tuple set, defining the mutation characteristic according to a formula of $$w_j^i = \begin{cases} \dfrac{|\phi_j^i - \phi_{j+\Delta}^i|}{e_j^i - e_{j+\Delta}^i}, & j + \Delta \leq K + 2 \\ 0, & \text{otherwise} \end{cases}$$

where,
$V_i = \{v_1^i = (e_1^i, \phi_1^i), v_2^i = (e_2^i, \phi_2^i), \ldots, v_j^i = (e_j^i, \phi_j^i), v_{j+1}^i = (e_{j+1}^i, \phi_{j+1}^i), \ldots, v_{K+1}^i = (e_{K+1}^i, \phi_{K+1}^i), v_{K+2}^i = (e_{K+2}^i, \phi_{K+2}^i)\}$ is the set of all two-tuples, $\phi_j^i$ is the model generalization error upper bound, $e_j^i$ is the configuration parameter in the configuration parameter set corresponding to the operation, Δ is an integer hyper-parameter greater than or equal to 1, and K is an integer greater than or equal to 0; and constructing the mutation characteristic set as $W_i=\{w_1^i, w_2^i, \ldots, w_j^i, w_{j+1}^i, \ldots, w_{K+1}^i, w_{K+2}^i\}$.

18. The apparatus of claim 17, wherein, for each optional operation in the intersection of the first optional operation subset and the second optional operation subset, determining a final parameter setting value of the optional operation based on the corresponding mutation characteristic set, comprises:

for the mutation characteristic set associated with each optional operation in the intersection of the first optional operation subset and the second optional operation subset, comparing $w_j^i$ with a preset threshold starting from j=1 and gradually increasing by 1; and determining the parameter value corresponding to $w_j^i$ in response to $w_j^i$ being greater than the preset threshold, as the final parameter setting value.

19. A non-transitory computer readable storage medium stored thereon with a computer program that, when executed by a processor applied to a collaborative learning edge node under the edge computing scenario, cause the processor to implement a method for actively defending against backdoor attacks under an edge computing scenario, the edge node being deployed a deep learning model, the method comprising:

generating an initial optional operation set based on optional operations configured to enhance a model generalization ability, and constructing a configuration parameter set for each optional operation in the initial optional operation set;

selecting a first optional operation subset from the initial optional operation set, wherein for each optional operation in the first optional operation subset, a curve between configuration parameters and model accuracies presents a monotonically decreasing concave function characteristic;

selecting a second optional operation subset from the initial optional operation set, wherein for each optional operation in the second optional operation subset, a curve between configuration parameters and probabilities that the deep learning model is successfully attacked by the backdoor attack presents a monotonically decreasing convex function characteristic;

constructing a mutation characteristic set for each optional operation in an intersection of the first optional operation subset and the second optional operation subset according to a preset formula;

for each optional operation in the intersection of the first optional operation subset and the second optional operation subset, determining a final parameter setting value of the optional operation based on the mutation characteristic set; and actively defend against possible backdoor attacks by training and using the deep learning model with a parameter of the optional operation being set to the final parameter setting value, wherein the final parameter setting value decreases a probability of the deep learning model being embedded with an effective backdoor.

* * * * *